(12) United States Patent
Lepage et al.

(10) Patent No.: US 10,953,564 B2
(45) Date of Patent: Mar. 23, 2021

(54) SPIKE FOR HARVESTER HEADS AND DEBARKER ROLLERS

(71) Applicants: ÉQUIPEMENTS BOIFOR INC., McMasterville (CA); ÉQUIPEMENT FABMEC INC., Saguenay (CA)

(72) Inventors: Marc Lepage, Mont-Saint-Hilaire (CA); Nicolas Fortier, Chicoutimi (CA)

(73) Assignees: ÉQUIPEMENTS BOIFOR INC., McMasterville (CA); ÉQUIPEMENT FABMEC INC., Saguenay (CA)

( * ) Notice: Subject to any disclaimer, the term of this patent is extended or adjusted under 35 U.S.C. 154(b) by 258 days.

(21) Appl. No.: 15/699,411

(22) Filed: Sep. 8, 2017

(65) Prior Publication Data

US 2019/0077042 A1    Mar. 14, 2019

(51) Int. Cl.
*B27L 1/04* (2006.01)
*A01G 23/08* (2006.01)

(52) U.S. Cl.
CPC .............. *B27L 1/045* (2013.01); *A01G 23/08* (2013.01)

(58) Field of Classification Search
CPC .... A01G 23/08; A01G 23/081; A01G 23/083; A01G 23/091; A01G 23/093; A01G 23/095; A01G 23/0954; B27L 1/00; B27L 1/045; B27L 1/08; B27L 1/10; B27L 1/12; B27L 1/122; B27L 1/125; B27L 1/127; B02C 18/2225; B02C 18/2266; B02C 18/2283; A01B 45/02; E21B 10/5673; E21B 10/58; Y10T 407/181; Y10T 407/1815; Y10T 407/195; Y10T 407/1958; B21D 31/02; E02D 3/0265

USPC ......... 172/21; 241/291, 294; 299/79.1, 101, 299/111, 113; 407/55–63, 29.12; 72/324, 325; 404/124
See application file for complete search history.

(56) References Cited

U.S. PATENT DOCUMENTS

| | | | |
|---|---|---|---|
| 2,876,563 A * | 3/1959 | Aitken | A43C 15/02 36/7.7 |
| 3,667,584 A * | 6/1972 | Karlsson | B27B 25/02 193/37 |
| 3,991,800 A | 11/1976 | Palmquist | |

(Continued)

FOREIGN PATENT DOCUMENTS

| CN | 2899522 | 5/2007 |
|---|---|---|
| JP | 5-199909 | 8/1993 |

(Continued)

OTHER PUBLICATIONS

Lapsed Malaysian Industrial Design Application No. 99-00082-0101, "Golf Shoe Spike" filed on: Feb. 11, 1999, by WaterTec (M) SDN. BHD.

(Continued)

*Primary Examiner* — Shelley M Self
*Assistant Examiner* — Jared O Brown
(74) *Attorney, Agent, or Firm* — Benoit & Cote, Inc.; C. Marc Benoit (57) ABSTRACT

A feed roll spike for mounting to a surface, i.e. the outer surface of a feed roller of a harvester head or a debarking machine. The feed roll spike comprises a substantially truncated cone shape base having a top side, a bottom side and an axis; and evenly-spaced identical projections extending upwardly from the top side of the base. The space between the projections defines channels.

17 Claims, 5 Drawing Sheets

(56) References Cited

U.S. PATENT DOCUMENTS

| | | | |
|---|---|---|---|
| 4,014,114 A | 3/1977 | Jordan et al. | |
| 4,385,650 A * | 5/1983 | Schmidt | B65G 39/02 |
| | | | 144/248.5 |
| 4,509,574 A * | 4/1985 | Gaitten | B27L 1/04 |
| | | | 144/208.8 |
| 4,609,020 A | 9/1986 | Hutson | |
| 4,653,561 A | 3/1987 | Payeur | |
| 4,875,511 A | 10/1989 | Wingate-Hill et al. | |
| 5,022,446 A | 6/1991 | Wingate-Hill et al. | |
| 5,551,760 A * | 9/1996 | Sollami | E21B 10/567 |
| | | | 299/105 |
| 5,944,078 A | 8/1999 | Lindholm | |
| 5,957,177 A | 9/1999 | Smith et al. | |
| 5,957,652 A | 9/1999 | Pratt | |
| 5,960,568 A | 10/1999 | Bell et al. | |
| 5,992,059 A * | 11/1999 | Bettenga | A43C 15/162 |
| | | | 36/134 |
| 6,481,471 B1 | 11/2002 | Johnson et al. | |
| 6,631,571 B2 | 10/2003 | McMullin | |
| 7,047,674 B1 * | 5/2006 | Garvie | A43C 15/161 |
| | | | 36/127 |
| 7,073,281 B2 | 7/2006 | Terashina | |
| RE40,047 E | 2/2008 | Carroll | |
| 7,412,784 B1 | 8/2008 | Bobbett | |
| 7,537,031 B2 | 5/2009 | Jarck | |
| 7,640,956 B2 | 1/2010 | Arvidsson | |
| 7,774,958 B2 | 8/2010 | Carruthers | |
| 7,882,869 B2 | 2/2011 | Kube et al. | |
| 7,891,118 B2 | 2/2011 | Chen et al. | |
| 8,689,468 B2 | 4/2014 | Curley | |
| 9,161,594 B2 | 10/2015 | Jungkind | |
| 2002/0144438 A1 * | 10/2002 | Better | A43B 5/001 |
| | | | 36/127 |
| 2002/0152643 A1 | 10/2002 | Kim | |
| 2004/0211489 A1 * | 10/2004 | Isley | A01G 23/095 |
| | | | 144/246.1 |
| 2007/0101618 A1 | 5/2007 | Peake | |
| 2008/0156397 A1 * | 7/2008 | Arvidsson | B27B 25/02 |
| | | | 144/208.9 |
| 2009/0238649 A1 * | 9/2009 | Kruszynski | B23B 51/048 |
| | | | 407/40 |
| 2010/0141016 A1 * | 6/2010 | Yang | E21C 35/18 |
| | | | 299/101 |
| 2014/0101970 A1 | 5/2014 | Krikorian et al. | |
| 2014/0260876 A1 * | 9/2014 | MacLennan | B27B 33/12 |
| | | | 83/835 |
| 2015/0360385 A1 * | 12/2015 | Shaver | B27B 33/08 |
| | | | 83/843 |
| 2016/0309846 A1 | 10/2016 | Fisher | |

FOREIGN PATENT DOCUMENTS

| | | |
|---|---|---|
| JP | 11-332612 | 12/1999 |
| JP | 2000189210 | 7/2000 |
| JP | 2001087004 | 4/2001 |
| JP | 2001204508 | 7/2001 |
| JP | 2001211910 | 8/2001 |
| JP | 2003052412 | 2/2003 |
| JP | 2003144206 | 5/2003 |
| TW | M499795 | 5/2015 |
| WO | 03037130 | 5/2003 |
| WO | 2006100340 | 9/2006 |
| WO | 2015127775 | 9/2015 |
| WO | 2016003905 | 1/2016 |

OTHER PUBLICATIONS

Lapsed Malaysian Industrial Design Application No. 04-00213-0102, "Golf Shoe Spike", filed on: Jan. 4, 2004, by WaterTec (M) SDN. BHD.

\* cited by examiner

SPIKE FOR HARVESTER HEADS AND DEBARKER ROLLERS

BACKGROUND

(a) Field

The present disclosure generally relates to log handling machines and more particularly to improvements in feed rollers and feed roll spikes.

(b) Related Prior Art

Feed rollers for logs are used in various log handling applications such as feeding unbarked logs through a harvester head or a debarker, feeding logs through a sawing machine, and for feeding trees through a delimber. Each of these exemplary applications has different requirements with respect to the feed characteristics of the log and of the feed rollers. Two basic requirements are that the feed rollers provide sufficient motive force to carry the logs through the processing station and that they be transported through the rollers without undue damage to the log or tree.

One of the applications requiring a significant motive force in view of the reaction forces created by the process is the delimber. In order to provide the motive force traction must be developed between the feed roller and the log surface. Typically spikes extending radially outwardly from the surface of the feed roller would act to clutch the log surface and motivate it. With significant reaction forces created by the delimber knives, the spikes are required to penetrate the surface of the log causing damage. Such damage reduces the value of the log based upon the fact that fewer and/or lower value products are produced. As the logs become generally smaller in diameter, the problem of surface damage becomes even more significant.

In a typical delimbing application a pair of spiked feed rollers will act in unison to pull a log through a set of delimbing knives. Each roller can be driven by a gear and pinion arrangement that is housed in a case which pivots about the pinion shaft. This structure, as will be well understood by those skilled in the art, allows the rollers to move laterally to adjust to the tree diameter. A suitable cross linkage provides simultaneous lateral motion and a hydraulic cylinder provides the opening and closing action allowing the rollers to continuously follow the surface of the tree. To develop the necessary traction, the spikes will penetrate the surface.

The significant forces involved in the delimbing application are the feed force acting parallel to the tree and a normal force forcing the feed roller spikes into the surface to generate the traction necessary to transmit the feed force. The normal force has several components. These forces acting through the spikes develop the required traction to overcome the reaction force from the knives and bring the trees through the knives at an adequate production rate.

Additionally, challenges exist in the processing of tree during different seasons, having the tree and the bark harden during the winter months. Such difference in the bark characteristics demands specific characteristics in the spikes to be operable in both conditions as to minimize the surface damages over the logs.

One known configuration of feed roll spikes consists in conical feed roll spikes. Rows of conical feed roll spikes are spaced about the circumference of the feed rollers to provide the best available feeding characteristics with the least amount of damage. Another typical configuration is the saw tooth where circumferentially spaced rows of saw tooth bars are affixed to the feed rollers surface.

It has been found that the known feed roll spike configurations could be improved to provide improved traction and less wood damage. Further desired advantage would be to have feed roll spikes debarking at least partially the logs without damaging the log. Furthermore, it would be desirable to provide feed roll spikes of simple construction and easy maintenance.

SUMMARY

According to an embodiment, there is disclosed a feed roll spike for mounting to a surface, the feed roll spike comprising: a substantially truncated cone shape base having a top side, a bottom side providing an interface with the surface; and evenly-spaced identical projections extending upwardly from the top side of the base, wherein space between the projections defines channels.

According to an aspect, the projections have a substantially pyramidal shape.

According to an aspect, the projections have an apex used for gripping.

According to an aspect, the projections have three faces.

According to an aspect, the base has an external face, and wherein one of the three faces of each projection expand seamlessly from the external face.

According to an aspect, the base has a center, and wherein the channels span from the center of the base to the external face of the base.

According to an aspect, two of the three faces of the projections are flat.

According to an aspect, one of the three faces is arc-shaped.

According to an aspect, the feed roll spike comprises a vertical axis which is substantially perpendicular to the top side and the bottom side, wherein at least one of the three faces is at an angle ALPHA of between about 5 degrees and 60 degrees relative to the vertical axis.

According to an aspect, the base has a circumference, wherein BETA is an angle between one of the faces of the projections facing toward an exterior of the feed roll spike and the vertical axis, wherein a ratio of the angles ALPHA over BETA is between about 2 over 3 and 3 over 2.

According to an aspect, the projections have an external face, a height and a width, and wherein a ratio of the height of the projections over the width of the projection is between about 1 over 1 and 1 over 3.

According to an aspect, the space of the top side between the projections and is substantially flat.

According to an aspect, a ratio of surface of the top side covered by the projections over surface of the top side covered by the channels is between about 2 over 5 and 4 over 5.

According to an aspect, each one of the channels comprises walls that are parallel to each other on an elevation plane parallel to the base for all distances of the elevation plane from the top side.

According to an aspect, the feed roll spike comprising an opening extending between the top side and the bottom side for fastening the gripping stud to the surface using a fastening means.

According to an aspect, the surface has a shape and wherein the bottom side comprises has a shape matching the shape of the mounting surface wherein the feed roll spike is fastened to the surface by welding.

According to an aspect, the projections are of an exact number of four (4).

According to an embodiment, there is disclosed a feed roll spike for mounting to a surface, the feed roll spike comprising: a base having a top side and a bottom side for mounting to the surface; evenly-spaced identical projections extending upwardly from the top side of the base; and channels have a width and a height, the channels extending radially between the projections over the top side, wherein the width of the channels between the projections is constant, and increases as a distance from the base increases.

According to an aspect, a ratio of surface of the top side covered by the projections over surface of the top side covered by the channels is between about 2 over 5 and 4 over 5.

According to an aspect, the projections have a substantially pyramidal shape and an apex.

According to an embodiment, there is disclosed a harvester head or debarking machine comprising a roll comprising a surface; and feed roll spikes for mounting to the surface roll, the feed roll spikes each comprising a substantially truncated cone shape base having a top side, a bottom side providing an interface with the surface; and evenly-spaced identical projections extending upwardly from the top side of the base, wherein space between the projections defines channels.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
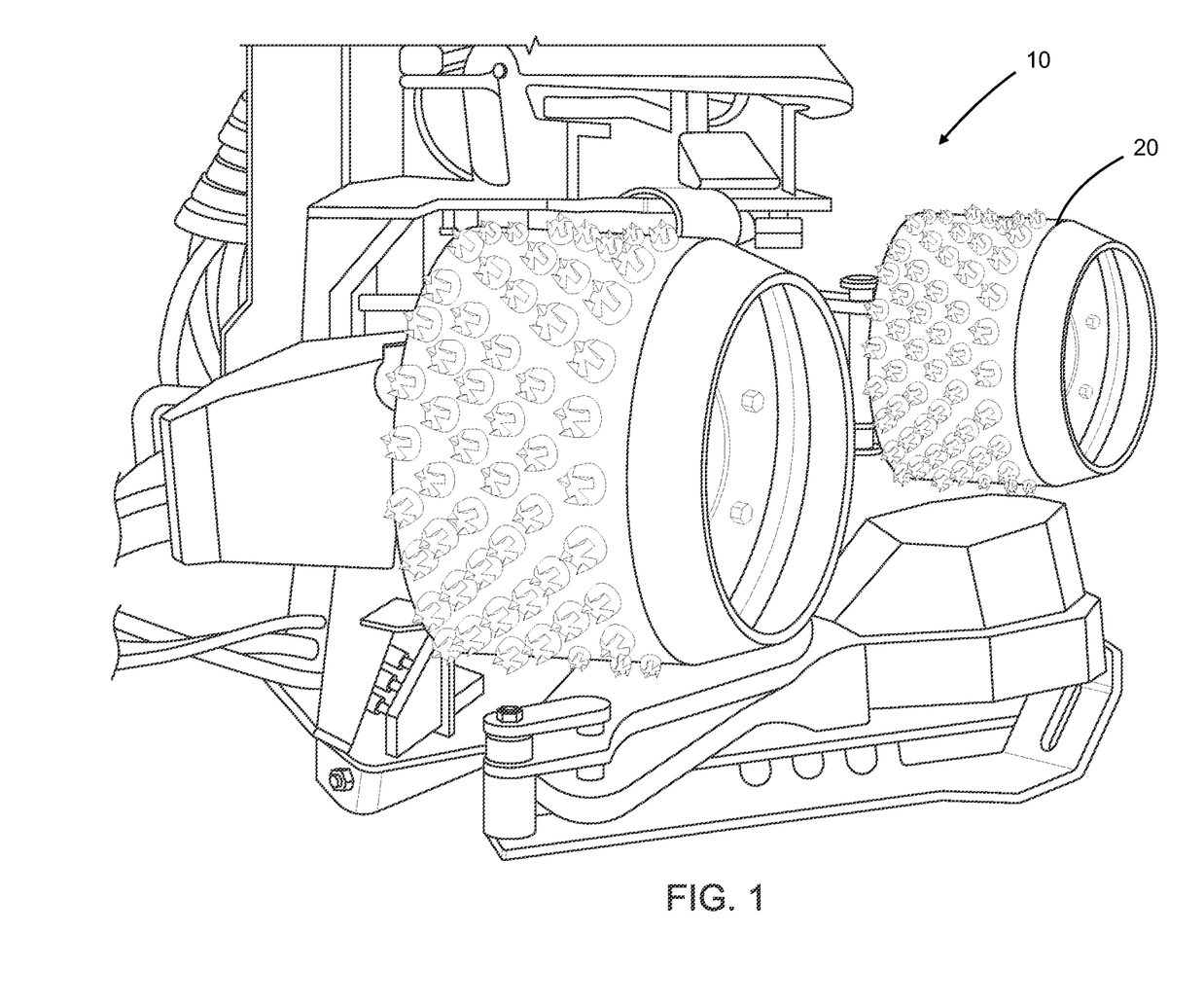
FIG. 1 is a perspective side view of a harvesting head or a debarking machine using feed roll spikes in accordance with an embodiment.

Referring now to the drawings, and more particularly to FIG. 1, there is shown therein a harvester head or a debarking machine, generally indicated at 10, which has embodied therein the improvements of the present invention.

Figure 2:
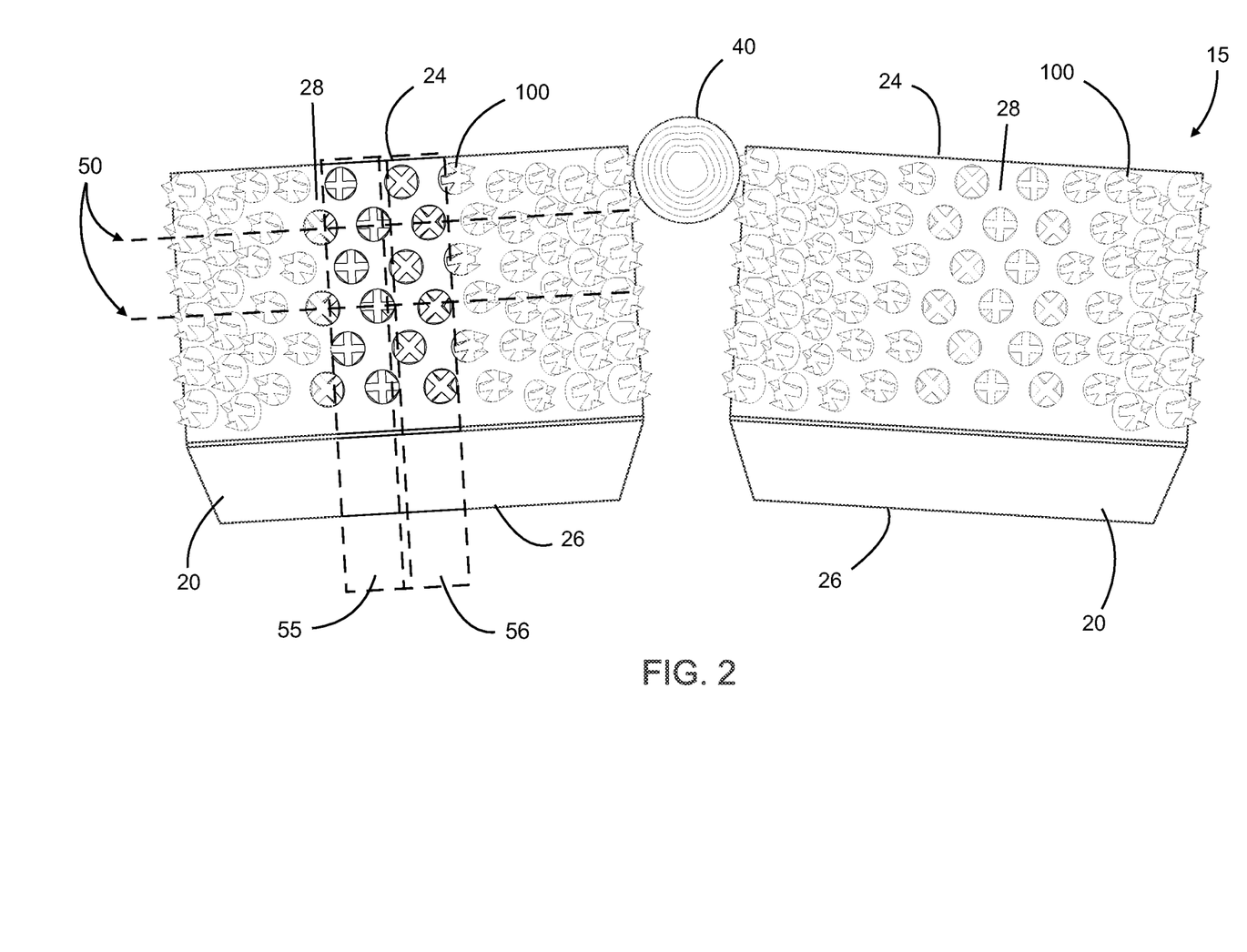
FIG. 2 is a top view of a pair of feed rollers operating on a log in accordance with an embodiment.
Figure 3A:
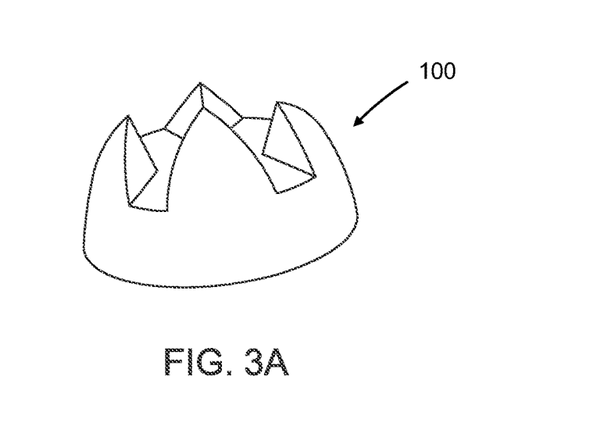
FIGS. 3A to 3E are a perspective view, a top view, a side view, and side views according to cutting lines D-D and E-E of a feed roll spike in accordance with an embodiment.
Figure 3B:
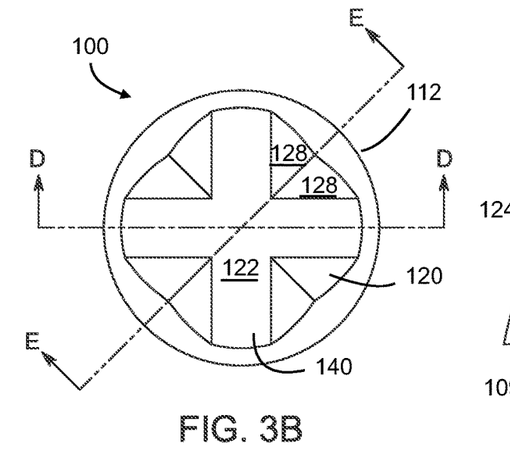
Figure 3C:
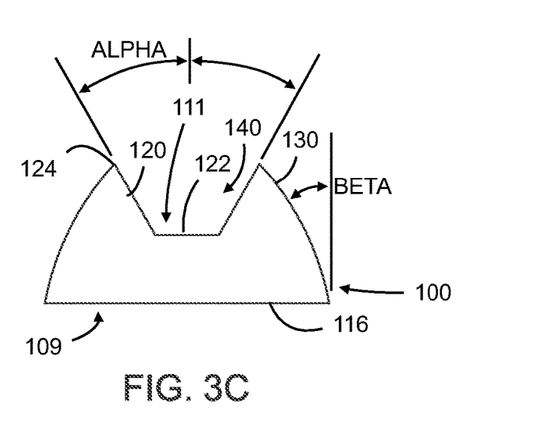
Figure 3D:
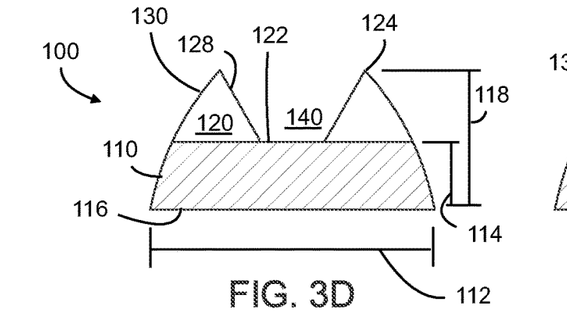
Figure 3E:
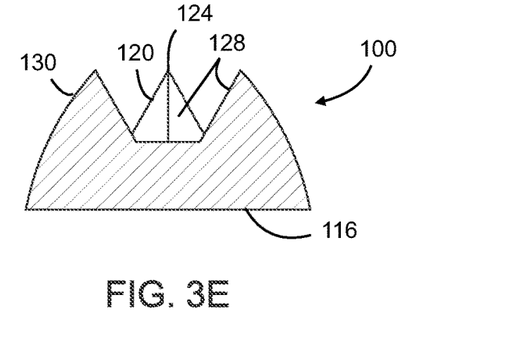

Referring additionally to FIG. 2, a feed roller assembly 15 comprising a pair of feed rollers 20 is illustrated. Each feed roller 20 is cylindrical and has inner end 24 and an outer end 26 and outer surface 28. As an example only, representative dimensions for a delimber application will be a length from the inner end 24 to the outer end 26 of approximately 425 mm and an external diameter of approximately 400 mm for each feed roller 20. Each feed roller 20 can be mounted on a pivotal base (not shown) over an upstanding shaft assembly (not shown) for easy removal. The feed rollers 20 are rotatable via suitable drive means (not shown). As previously pointed out the feed rollers 20 are moveable laterally in unison in order to contact two points on the surface of a log 40 or tree. A suitable means is provided (not shown) to force the feed rollers 20 into a tractive relationship with the log 40 and when power is applied to rotate the feed rollers 20 in opposite directions a tractive force will serve to feed the log 40 between the feed rollers 20 in the desired direction.

Mounted on the outer surface 28 of each feed roller 20 is a plurality of substantially uniformly spaced feed roll spikes 100. Feed roll spikes 100 are circumferentially spaced apart on the outer surface 28 of a distance about equal. Such a distance according to a non-limiting embodiment is approximately 12 degrees of arc or with about the same space occupied by the feed roll spike 100 than spike-free between feed roll spikes 100. According to an embodiment, the feed roll spikes 100 are mounted about straight mounting lines 50 surrounding the feed roller 20 and part of planes that are substantially perpendicular to the axis of rotation of the feed roller 20. Feed roll spikes 100 are mounted on the feed roller 20 about a plurality of such mounting lines 50 parallel to each other. The feed roll spikes 100 mounted about a mounting line 50 are radially offset from the feed roll spikes 100 mounted about a first-neighbor mounting line 50, so that feed roll spikes 100 mounted about a mounting line 50 and of a second-neighbor mounting line 50 have substantially aligned feed roll spikes 100 relative to the axis of rotation of the feed roller 20.

According to an embodiment, the feed roll spikes 100 are mounted according to a same radial orientation, for instance with the cross-shaped interior floor surface 122 (FIGS. 3A-E) having channels 140 (FIGS. 3A-E) aligned with the mounting line 50.

According to an embodiment, the feed roll spikes 100 are mounted in rows perpendicular to the direction of rotation of the feed roller 20 on which they are mounted. According to an embodiment, all feed roll spikes 100 in a row are mounted with their cross-shaped interior floor surface 122 in the same orientation.

According to an embodiment, all feed roll spikes 100 in two consecutive rows are mounted with their cross-shaped interior floor surface 122 in the same orientation.

According to an embodiment, all feed roll spikes 100 in a first set of two consecutive rows are mounted with their cross-shaped interior floor surface 122 in the same first orientation and all feed roll spikes 100 in a second set two consecutive rows are mounted with their cross-shaped interior floor surface 122 in the same second orientation, where the second orientation is at 45 degrees from the first orientation.

According to an embodiment, two neighboring feed roll spikes 100 mounted to the same mounting line 50 are radially offset from each other, the channels 140 of a feed roll spike 100 being at different angles from the neighboring feed roll spike 100 relative to their mounting line 50.

According to an embodiment, the feed roll spikes 100 are mounted to the feed roller 20 at random radial orientations.

According to an embodiment, the feed roll spikes 100 are mounted to the feed rollers 20 about mounting lines 50 that are distant from neighbor mounting lines 50 of about or a slightly greater distance than the diameter 112 (FIGS. 3A-E) of the feed roll spikes 100.

According to an embodiment, the feed roll spikes 100 are mounted to the feed rollers 20 about mounting lines 50 that are distant from neighbor mounting lines 50 of a smaller distance than the diameter 112 of the feed roll spikes 100. According to an embodiment, the distance between neighbor mounting lines 50 is between about 0.5 and 0.8 times the diameter 112 of the feed roll spikes 100.

Referring additionally to FIGS. 3A-E, the feed roll spikes 100 are of a substantially general truncated cone shape. According to embodiments, the truncated cone shape is defined as one among the group of a cone defined using a straight line revolving around a rotation axis, an inwardly curved line revolving around a rotation axis, and an outwardly curved line revolving around a rotation axis. In these embodiments, the top of the cone, including the apex, is truncated.

Accordingly, the feed roll spikes 100 comprises a base 110. According to embodiments, the base is either of a substantially cylindrical shape or of a truncated cone shape. The base 110 comprise a top side 111 and a bottom side 109. The bottom side 109 features a floor surface 116, of a substantially circular area having a base diameter 112. The base 110 has a thickness 114. The base 110 further comprises at its top side 111 an interior floor surface 122.

The feed roll spikes 100 are mounted to the outer surface 28 of the feed rollers 20 about the floor surface 116 using appropriate means selected among a group comprising welding, riveting, screwing, bolting, gluing, and clipping. It is worth mentioning that any solution to mount the feed roll spikes 100 to the outer surface 28 of the feed roller 20 providing the appropriate resistance between the feed roll spikes 100 and the outer surface 28 for the feed roll spike mounting to hold when contacting logs 40 may be appropriate. Mounting means that are permanent or alternatively allowing release of the feed roll spikes 100 for maintenance and/or replacement are all intended to be covered by the present disclosure.

The feed roll spikes 100 further comprise a total height 118 from the surface of the floor surface 116 to the tip 124 of each of the four (4) projections 120 of each of the feed roll spikes 100. Each feed roll spike 100 comprises four (4) identical projections 120, extending from the top side 111 to their tip 124. The interior floor surface 122 extending between the bases of the projections 120 defines a substantially flat cross-shaped surface. Four (4) arms or channels 140 extend outwardly unobstructed from the center of the feed roll spike 100 to the exterior of the base 110 with an increasing width as the height of the channel 140 increases.

The projections 120 each comprise three (3) faces, namely two interior faces 128 and one exterior face 130. The exterior face 130 of the projections 120 provides a continuous surface expanding from the exterior of the base 110 and respecting the generally conic shape of the feed roll spike 100. Thus, a continuous exterior surface covers the exterior of the feed roll spike 100 from the floor surface 116 and expanding seamlessly to the tips 124 of the projections 120. Each of the interior faces 128 extends with an angle ALPHA relative to a vertical plane, a plane perpendicular to a plane defined by the base 110 of the feed roll spike 100 and with the axis of the conic shape being part of the plane. The intersection of the general conic shape and the interior faces 128 resulting in the tip 124, namely an apex. The angle ALPHA is selected between about 5 degrees and about 60 degrees; the selected angle ALPHA providing a pair of interior faces 128 that are sloped to prevent bark of a log 40 from remaining stuck between the two interior faces 128, while providing increasing pressure surface on a tree 40 as the projections 120 penetrate in the bark of the log 40.

The configuration of the feed roll spikes 100, and particularly the presence of three potential tree-contacting surfaces per projections 120, namely the two interior faces 128 and the exterior face 130 each comprising a sloped contacting surface, makes the feed roll spikes 100 operable in any radial configuration and at any rotation angle of the feed rollers 120 as long as the feed roll spike 100 contacts the log 40. The clearance between the projections 120 that the channels 140 provide with their symmetrical sloped parallel walls prevents the clearance from being filled with bark during operation. The walls are parallel on all distances of the channels 140 from the top side 111. The cross shape of the channels 140 further allows bark to flow out of the channels 140 both tangentially and radially relative to the feed roller 20.

This non-limiting embodiment of a feed roll spike 100 features a diameter 112 of about 38 mm (1.5 inch), a total height 118 of about 19 mm (0.75 inch) and a base height 114/projection height of about 38 mm (0.375 inch) each; these dimensions being well adapted for operation during all seasons and normal conditions with typical North-American tree species.

According to an embodiment, the angle ALPHA is selected between about 5 degrees and 60 degrees relative to a vertical plane parallel to the base of the interior face 128 and perpendicular to the floor surface 116. According to an embodiment, the angle ALPHA is selected between about 10 degrees and 50 degrees. According to an embodiment, the angle ALPHA is selected between about 20 degrees and 45 degrees. According to an embodiment, the angle ALPHA is selected between about 25 degrees and 40 degrees. According to an embodiment, the angle ALPHA is about 30 degrees.

According to an embodiment, the average exterior angle BETA of the conic shape, thus the average slope of the exterior face 130 over the height of the feed roll spike 100, or the angle relative to a plane perpendicular to the base 110 and tangential to the cone circumference, is about of the same order as the angle ALPHA. According to an embodiment, the ratio of the angles ALPHA over BETA is between about 2 over 3 and 3 over 2.

According to an embodiment, the angle BETA is selected between about 5 degrees and 45 degrees relative to a plane perpendicular to the base 110 and tangential to the cone circumference. According to an embodiment, the angle BETA is selected between about 10 degrees and 40 degrees. According to an embodiment, the angle BETA is selected between about 15 degrees and 30 degrees. According to an embodiment, the angle BETA is about 20 degrees.

According to an embodiment, the conic shape of the feed roll spike 100 is about a radius of curvature toward the center of the feed roll spike 100. According to an embodiment, the ratio of the radius of curvature of the conic shape over the diameter 112 is between about 100 over 1 and 1 over 2. According to an embodiment, the ratio of the radius of curvature of the conic shape over the diameter 112 is between about 5 over 1 and 2 over 3. According to an embodiment, the radius of curvature of the conic shape is about the same as the diameter 112.

According to an embodiment, the ratio of the surface covered by the projections 120 over the surface covered by the channels 140 at the level of the top side 111 is between about 2 over 5 and 4 over 5. According to an embodiment, the ratio is about 3 over 5. Therefore, according to the previous embodiment, the surface of the feed roll spike 100 contacting a log 40 would increase abruptly from about three (3) square units to about eight (8) square units when the projections 120 penetrate of their whole height in the bark of the log 40.

According to an embodiment, the width of a projection 120 is measured through the length of a straight line joining the extremities of the exterior face 130 of the projection 120 at the level of the top side 111. The ratio of the projection height over the projection width is between about 1 over 1 and 1 over 3. According to an embodiment, the ratio of the projection height over the projection width is between about 4 over 5.

According to an embodiment, the exterior face 130 has a different finish than the interior face 128 of the projections 120. The interior faces 128 have a smooth surface easing removed bark to slip out of the channels 140. The exterior face 130 has a rough surface favoring to catch the bark and thus debarking the log 40.

According to an embodiment, the edge joining the interior floor surface 122 and the base of the projections 120 is chamfered to aid in flow of sap and ice.

Figure 4A:
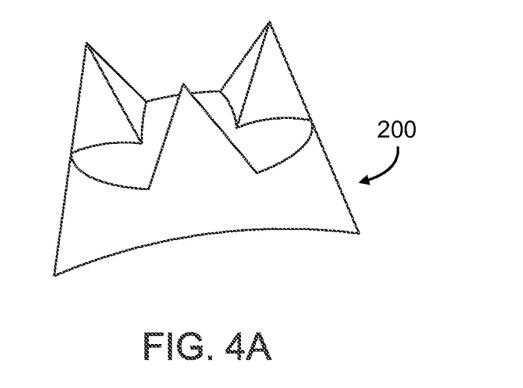
FIGS. 4A to 4C are a perspective view, a top view and a side view of a feed roll spike in accordance with another embodiment.
Figure 4B:
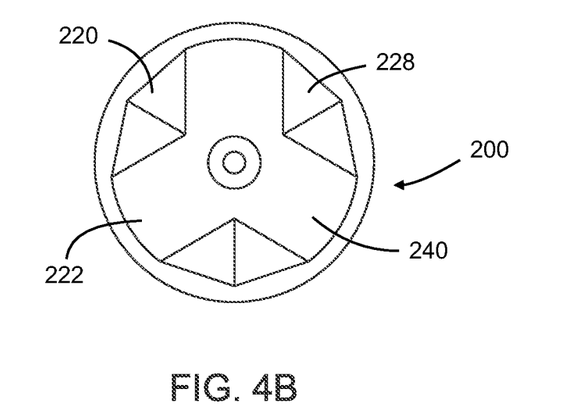
Figure 4C:
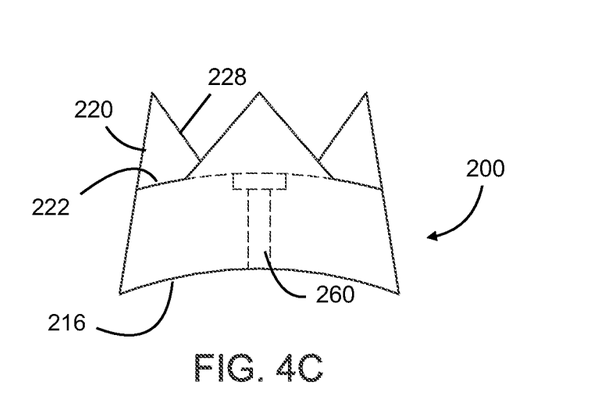
Figure 5A:
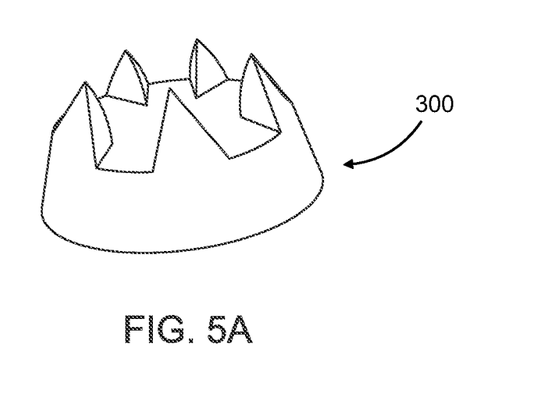
FIGS. 5A to 5C are a perspective view, a top view and a side view of a feed roll spike in accordance with another embodiment.
Figure 5B:
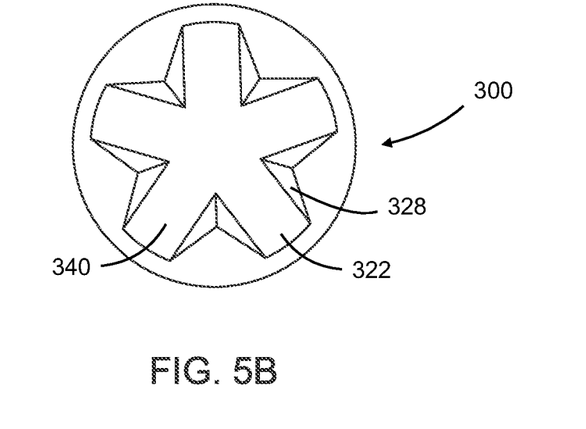
Figure 5C:
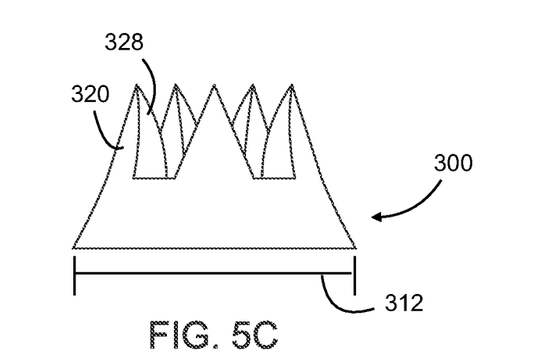

Now referring to FIGS. 4A-C and 5A-C, these are alternative embodiments of feed roll spikes 200, 300 that features a distinct number of projections 120. FIGS. 4A-C show a feed roll spike 200 having three (3) projections 220. The interior floor surface 222 is this embodiment features three (3) channels 240 evenly distributed in-between. FIGS. 5A-C show a feed roll spike 300 having five (5) projections 220 with a corresponding shape of interior floor surface 322.

It is worth mentioning that regardless of the number of projections 120, 220, 320 of an embodiment, the above-discussed ratios are to be respected to reach the objectives in contact surface between the feed roll spike 100, 200, 300 and the log 40, as easiness for clearance of bark from the channels 140, 240, 340.

It should also be noted that the channels 240, 340 feature parallel walls through the interior faces 228, 328 of the projections 220, 320 for efficiently allow material to move freely out of the channels 240, 340 both radially and tangentially.

The feed roll spike 200 of FIGS. 4A-C feature a slightly arched floor surface 216 for efficient coupling to the outer surface 28 of a feed roller 20. The feed roll spike 200 also features a slightly arched interior floor surface 222. It is worth noting that the degrees of curvature of the arched floor surface 116 and the arched interior floor surface 222 have been exaggerated on the drawing for illustration purposes.

The feed roll spike 200 of FIGS. 4A-C features a straight-revolving-line conic shape. The feed roll spike 300 of FIGS. 5A-C features an inwardly-curved-revolving-line conic shape providing a different change in the increase of contact surface as the projections 320 enters the bark of a log 40.

The feed roll spike 300 of FIGS. 5A-C features projections 320 comprising arch-shapes interior faces 328. The arch-shape interior faces 328 provide a non-linear increase of the contact surface of the feed roll spike 300 as the projections 320 penetrate the bark of a log 40. The ratio of radius of curvature of the arch-shapes interior faces 328 over the diameter 312 of the feed roll spike 300 is set over about 3 over 1 to provide a gripping apex and efficient slope at the bottom of the channels 340.

The feed roll spike 200 of FIGS. 4A-C further features a central hole 260 for a bolt or screw (i.e., a fastening means) to be used to fasten the feed roll spike 200 to the feed roller 20. The central hole 260 is shaped for the bolt or screw to be housed within the feed roll spike 200 with its top almost flat to the interior floor surface 222. According to another embodiment (not shown), the bolt or screw is covered with a cap to provide a flat top side of the base to ease bark material moving out of the channels 240.

Furthermore, feed roll spikes 100, 200, 300 having a generally conic shape are easily manufactured through molding, providing a low-cost high-volume manufacturing solution. The feed roll spikes 100, 200, 300 are typically made of a highly resistant material, such as metal and particularly steel, that is well adapted for extended use periods as for mounting to the feed rollers 20 using a welding process.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A feed roll spike for mounting to a surface of a feed roll, the feed roll spike comprising:
    a truncated cone shape base having a top side and a bottom side, wherein the bottom side has a larger area than the top side and provides an interface with the surface of the feed roll; and
    evenly-spaced identical projections extending upwardly from the top side of the base, wherein space between the projections defines channels,
    wherein the feed roll spike is mounted to the surface of the feed roll; and
    wherein a ratio of surface area of the top side covered by the projections over surface area of the top side covered by the channels is between about 2 over 5 and 4 over 5.

2. The feed roll spike of claim 1, wherein the projections have a pyramidal shape.

3. The feed roll spike of claim 1, wherein the projections have an apex used for gripping.

4. The feed roll spike of claim 1, wherein the space of the top side between the projections is flat.

5. The feed roll spike of claim 1, wherein each one of the channels comprises symmetrical sloped walls, wherein lines, which are defined by an intersection of the walls with any elevation plane parallel to the top side, are parallel.

6. The feed roll spike of claim 1, further comprising an opening extending between the top side and the bottom side for housing a fastening means used to fasten the feed roll spike to the surface.

7. The feed roll spike of claim 1, wherein the surface has a shape and wherein the bottom side has a shape matching the shape of the surface wherein the feed roll spike is fastened to the surface by welding.

8. The feed roll spike of claim 1, wherein the projections are of an exact number of four (4).

9. The feed roll spike of claim 1, wherein the projections have three faces.

10. The feed roll spike of claim 9, wherein the base has an external face, and wherein one of the three faces of each projection expand seamlessly from the external face.

11. The feed roll spike of claim 10, wherein the base has a center, and wherein the channels span from the center of the base to the external face of the base.

12. The feed roll spike of claim 9, wherein two of the three faces of the projections are flat.

13. The feed roll spike of claim 9, wherein one of the three faces is arc-shaped.

14. The feed roll spike of claim 9, wherein the projections have an external face, a height and a width, and wherein a ratio of the height of the projections over the width of the projections is between about 1 over 1 and 1 over 3.

15. A feed roll spike for mounting to a surface of a feed roll, the feed roll spike comprising:
    a truncated cone shape base having a top side and a bottom side, wherein the bottom side has a larger area than the top side and provides an interface with the surface of the feed roll; and evenly-spaced identical projections extending upwardly from the top side of the base, wherein space between the projections defines channels, wherein the projections have three faces, and wherein the feed roll spike further comprises a vertical axis which is perpendicular to the top side and the bottom side, wherein at least one of the three faces is at an angle ALPHA of between about 5 degrees and 60 degrees relative to the vertical axis.

16. The feed roll spike of claim 15, wherein the base has a circumference, wherein BETA is an angle between one of the faces of the projections facing toward an exterior of the feed roll spike and the vertical axis, wherein a ratio of the angles ALPHA over BETA is between about 2 over 3 and 3 over 2.

17. A feed roll spike mounted to a surface of a feed roll, the feed roll spike comprising:

a base having a top side and a bottom side, wherein the bottom side is mounted directly to the surface of the feed roll;

projections extending upwardly from the top side of the base; and channels having a width and a height, the channels extending radially between the projections over the top side, wherein the width of the channels between the projections is constant at the base, and increases as a distance from the base increases; and wherein a ratio of surface area of the top side covered by the projections over surface area of the top side covered by the channels is between about 2 over 5 and 4 over 5.

* * * * *